S. H. MARTIN.
INSECT OR WORM DESTROYER.
APPLICATION FILED APR. 11, 1912.

1,068,685.

Patented July 29, 1913.

Witnesses

Inventor
S. H. Martin
By Chas. A. Briscoe
Attorney

UNITED STATES PATENT OFFICE.

SAMUEL H. MARTIN, OF BRADY, TEXAS.

INSECT OR WORM DESTROYER.

1,068,685.  Specification of Letters Patent.  Patented July 29, 1913.

Application filed April 11, 1912. Serial No. 689,964.

*To all whom it may concern:*

Be it known that I, SAMUEL H. MARTIN, a citizen of the United States, residing at Brady, in the county of McCulloch and State of Texas, have invented certain new and useful Improvements in Insect or Worm Destroyers, of which the following is a specification.

This invention relates to insect or worm destroyers, and is designed particularly to construct a device of this nature wherein a plurality thereof may be secured to the frame of a gang or sulky cultivator and operate upon rows of plants for the purpose of killing the boll weevil and other insects.

It has for its object to combine the operation of cultivating the soil and destroying or exterminating the insects, worms, etc., from the plants, which has heretofore necessitated the use of two operations and machines.

With the above and other objects in view, my invention consists in the construction, combination, and arrangement of parts, all as will hereinafter be more fully described, illustrated and claimed, wherein:—

Figure 1:
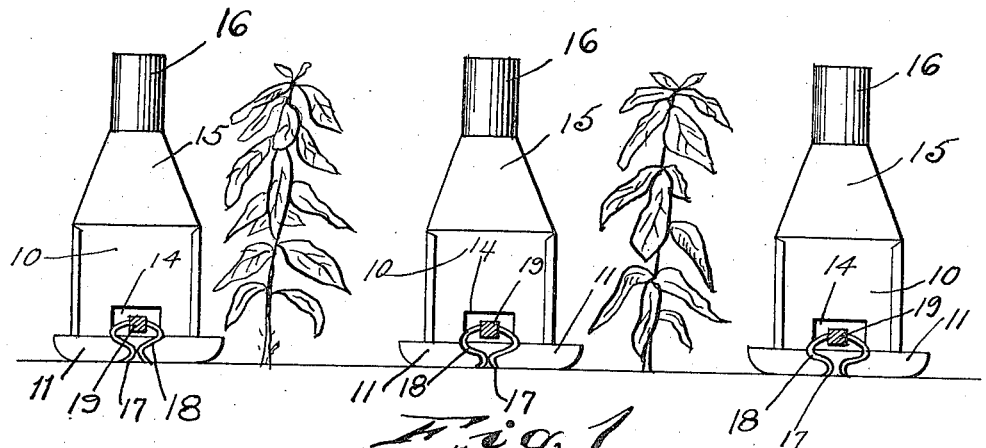
Figure 2:
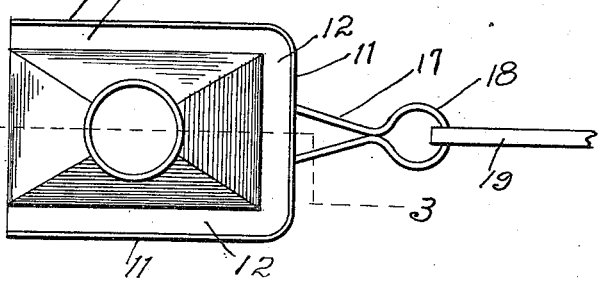
Figure 3:
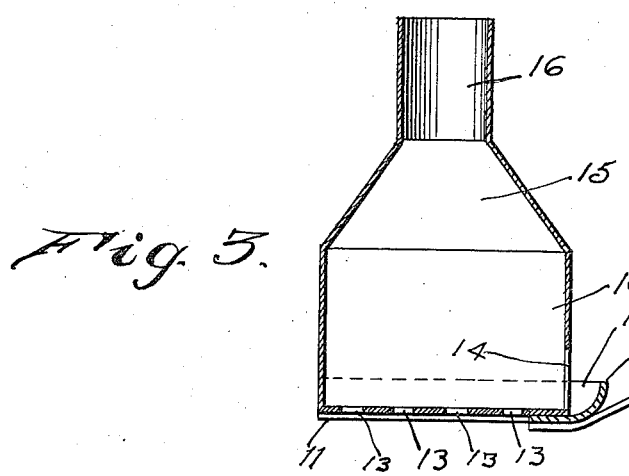

Figure 1 is a front elevation of a plurality of exterminators forming the subject matter of the present invention illustrating the coöperation thereof with the rows of plants, the connections between said exterminator, and the gang cultivator shown in section. Fig. 2 is a top plan view thereof. Fig. 3 is a vertical section taken along line 3—3 of Fig. 2.

The insect exterminator or destroyer which is adapted to operate between the rows of plants, comprises a receptacle or furnace which constitutes a fire box, being rectangular in cross-section and having an upwardly curved flange formed about the longitudinal sides thereof, and the forward end thereof. The bottom of the receptacle is pierced by the plurality of openings, through which the ashes and debris of the fire within said receptacle is ejected. The upper portion of the receptacle is provided with a truncated, pyramidoidal cover which coöperates with a tubular stack for the purpose of emitting smoke, etc. The forward side of the receptacle or furnace is provided with a loop whereby the same may be attached to the cultivator.

Reference being had more particularly to the drawings, 10 indicates a rectangular receptacle or furnace provided along the bottom with an upwardly curved flange 11 upon the two longitudinal sides thereof, and the forward end of said furnace, constituting a groove or channel 12 about three sides of the receptacle. The bottom of the receptacle or furnace 10 is pierced by a plurality of openings 13, which are slightly elevated above the surface of the ground, by reason of the fact that the lower ends of the flanges 11 extend under the bottom of the receptacle and operate somewhat after the manner of runners. These openings 13 provide a means whereby the ashes and other debris of the fire located within the receptacle or furnace may be ejected therefrom. The forward side of the receptacle or furnace 10 is provided with the rectangular draft opening 14 whereby sufficient draft is provided to insure thorough ignition of the fuel within the receptacle of furnace 10. The upper edge of the receptacle 14 is provided with a truncated, pyramidoidal cover 15 which opens into a tubular stack 16 by means of which the smoke created by the ignition of the fuel within the receptacle or furnace 10 may be emitted from the exterminator.

A loop wire or draft device 17 has its terminals secured under the forward flange 11 and is provided with an eye 18 by means of which the connection 19 is secured to the exterminator.

A number of the exterminators and destroyers, heretofore described are secured by the connections 19 to a gang plow or cultivator and operate between the rows of plants or cotton as illustrated in Fig. 1 at the rear of the cultivator. The heat from the fire within the furnaces causes the boll weevils or insects to drop from the leaves of the plants and be utterly destroyed. The major portion of the worms or insects are received in the channel or groove 12 as they drop from the plants, etc.

Having thus fully described my invention, what I claim as new and wish to secure by U. S. Letters Patent, is:—

An insect exterminator comprising a rectangular receptacle provided with a perforated bottom adapted to be drawn in slidable contact with the ground, a flange extending around three sides of the bottom of said receptacle and curved outwardly and upwardly to form a receptacle for the insect to be received in and the under side of the bulged portion of the flange forming runners for the said receptacle, a truncated pyramidal covering coöperating with said receptacle and a tubular stack carried by said pyramidal cover.

In testimony whereof I affix my signature in presence of two witnesses.

SAMUEL H. MARTIN.

Witnesses:
J. F. QUICKSALL,
J. K. BAZE.

Copies of this patent may be obtained for five cents each, by addressing the "Commissioner of Patents, Washington, D. C."